H. HIZER.
Cleaning Clover Seed.
No. 4,080.
Patented June 14, 1845.
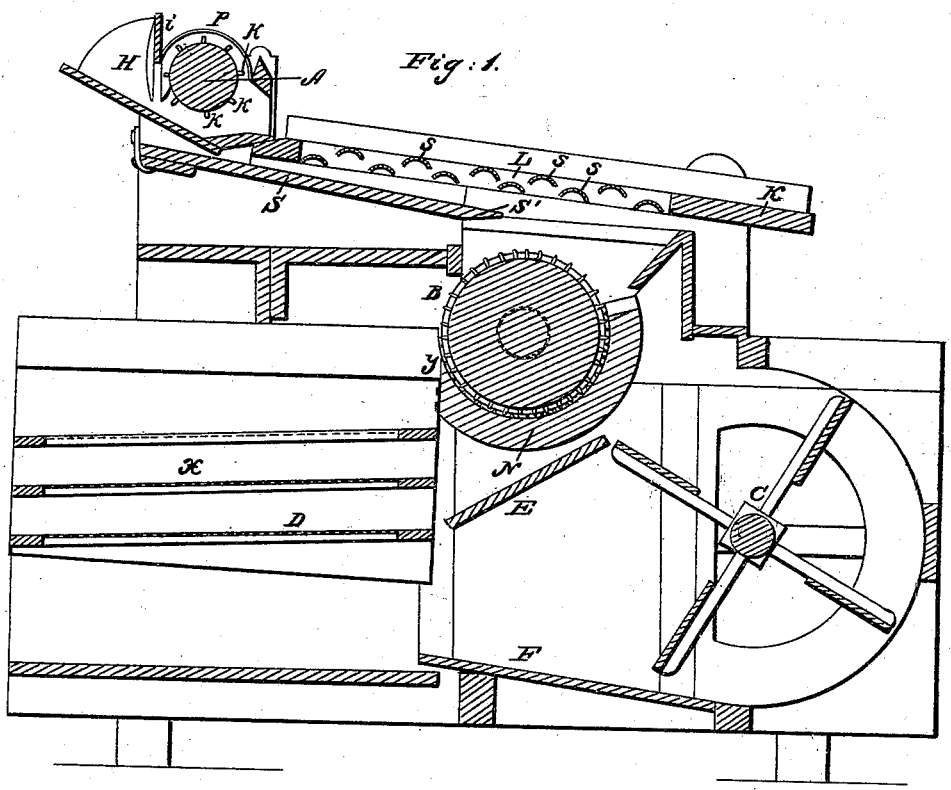
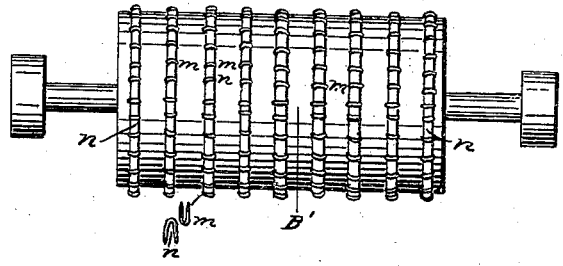

UNITED STATES PATENT OFFICE.

HENRY HIZER, OF WOOSTER, OHIO.

CLOVER-HULLING MACHINE.

Specification of Letters Patent No. 4,080, dated June 14, 1845; Antedated May 4, 1845.

*To all whom it may concern:*

Be it known that I, HENRY HIZER, of Wooster, in the county of Wayne and State of Ohio, have invented a new and useful Improvement in Constructing Clover-Machines; and I do hereby declare that the following is a full, clear, and exact description thereof, reference being had to the drawing accompanying.

The construction of my improved clover machine is as follows: The drawing represents a section through the center of the machine.

A, is a separating machine, B, the thresher, and C, the fanning machine. The separator consists of a cylinder A, surrounded with pins (k,) arranged diagonally so as not to follow each other. This part of the machine is moved by a strap outside the frame, from the shaft of the cylinder B, and not shown in the drawing and is surrounded by the smooth concave P.

L, represents a screen, the slats of which are sheet iron strips, made semi-cylindrical and placed with the convex sides turned up, as represented by the cross section of them (s,) they are placed in two rows with the strips alternating so that the top ones are over the spaces in the row below. The thresher consists of a cylinder B, and concave N. A detached view of said cylinder is represented by the Fig. 2, B'. It is constructed of strong staves and is banded by hoops (n, n,) triangular or other suitable form. These hoops are fastened with forked teeth or staples (m,) which are driven into the staves over said hoops at proper distances as shown in the Fig. 2. Below one of the staples is shown detached. A notch is also cut into the triangular hoop and the teeth let half way into the hoop as additional support. The cylinder of the thresher moves in the concave N, that is formed with ribs constructed similar to those in the cylinder, which rise above the concave so as to mesh between the hoops on the convex cylinder. This concave may be adjusted by means of screws or otherwise. The moving power which may be either water or horse power, is attached to the shaft of the thresher B, and communicated to the other parts of the machine by drums and straps.

C, represents the fanning machine, which creates a current of air, which passes between two wind boards that enter from the curved case above and below and converge as they approach the sieves, and directs the air under the screens D, which are in the shaking shoe, all of common construction for separating the chaff from the seed.

The clover is first placed in the hopper H, when it is drawn into the separator A, the feed being regulated by a sliding board (i) in front of the hopper. The large screen L, carries off the rough straw and sticks at K, leaving the clover heads to fall through between the double slats (s, s, s,) onto the board (s,) from thence the clover heads are carried to the thresher at (s') when it is drawn through between the teeth of the cylinder and concave B, N, and is from thence discharged onto the screens at T. These screens are of common construction and placed in the shaking shoe. Passing through the triple screen D, the chaff is separated and driven out by the current of air created by the fanning machine C.

What I claim as my invention and desire to secure by Letters Patent is—

1. The screen L, composed of strips of metal of a curved form constructed and arranged as above specified.

2. I also claim constructing the cylinder and concave with wrought iron hoops as described projecting from the surface and fastened with staples that form teeth thereon in the manner and for the purpose above made known.

HENRY HIZER.

Witnesses:
JOHN BEISTLE,
GEORGE LIGE.